July 3, 1962  S. R. BABCOCK ETAL  3,042,786
ELECTRICAL HEATING APPARATUS
Filed Aug. 14, 1958  5 Sheets-Sheet 1

INVENTORS
SCOTT R. BABCOCK
HERBERT E. PETERSON
BY
Andrew F. Wintercorn
ATTORNEY

INVENTORS
SCOTT R. BABCOCK
HERBERT E. PETERSON
BY
Andrew F. Wintercorn
ATTORNEY

July 3, 1962 S. R. BABCOCK ETAL 3,042,786
ELECTRICAL HEATING APPARATUS
Filed Aug. 14, 1958 5 Sheets-Sheet 4

INVENTORS
SCOTT R. BABCOCK
HERBERT E. PETERSON
BY
ATTORNEY

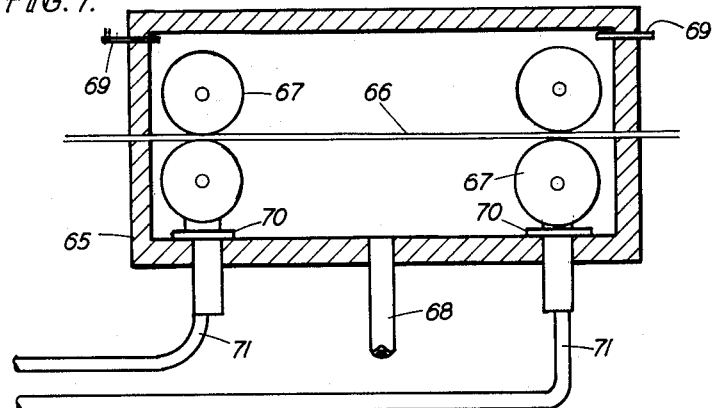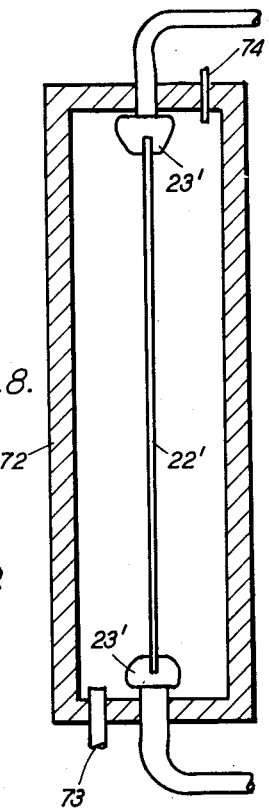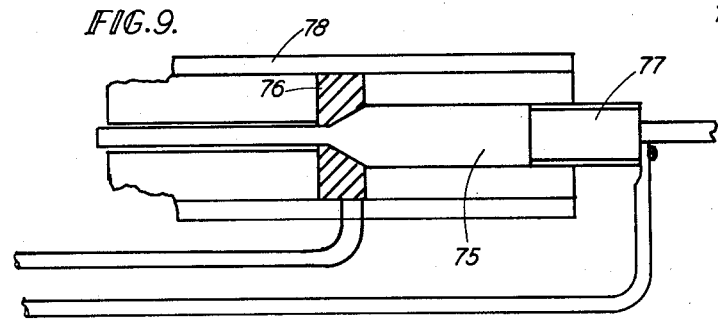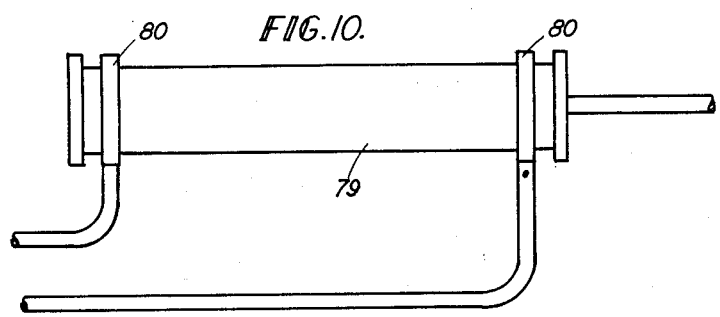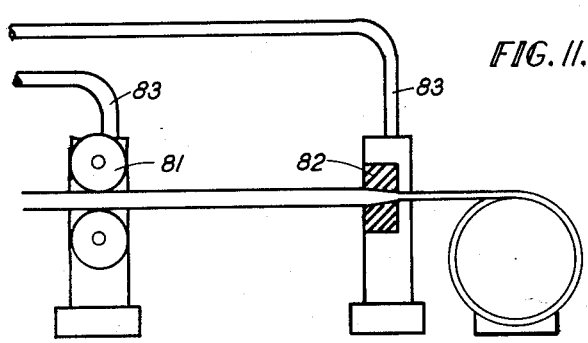

United States Patent Office 3,042,786
Patented July 3, 1962

3,042,786
ELECTRICAL HEATING APPARATUS
Scott R. Babcock, Loves Park, and Herbert E. Peterson, Winnebago, Ill., assignors, by mesne assignments, to American Brake Shoe Company, Chicago, Ill., a corporation of Delaware
Filed Aug. 14, 1958, Ser. No. 754,959
5 Claims. (Cl. 219—50)

This invention relates to electrical resistance heating apparatus and is more particularly concerned with such apparatus designed for heating metallic parts preliminary to forging, warm forming, hot heading, warm heading and hot and warm punch press work, as well as for heat treating, and in general, for heating or warming sheets, rods, wire, bars and pipes preliminary to hot or warm working of metal or any other material and wherever controlled heating of any parts or pieces is advantageous in any way.

One object of the invention is to provide electrical resistance heating apparatus which is accurately controlled to provide a desired flow of heating current at all times.

Another object is to provide such apparatus which is extremely simple with a minimum number of moving parts and yet which effects a very rapid and accurate control of the current.

According to a feature of the invention, low voltage current is supplied to the load through a step down transformer and a saturable reactor in series with the transformer primary winding is controlled in response to the temperature of the work to control the heating current. In one desirable construction the retactor has a tapped primary winding any desired tap of which can be selected by the control means to provide a wider control range.

The invention is illustrated in the accompanying drawings, in which—

FIGS. 4 to 11 are illustrations of various other applications of the present invention.

Similar reference numerals are applied to corresponding parts throughout the views.

Figure 1:
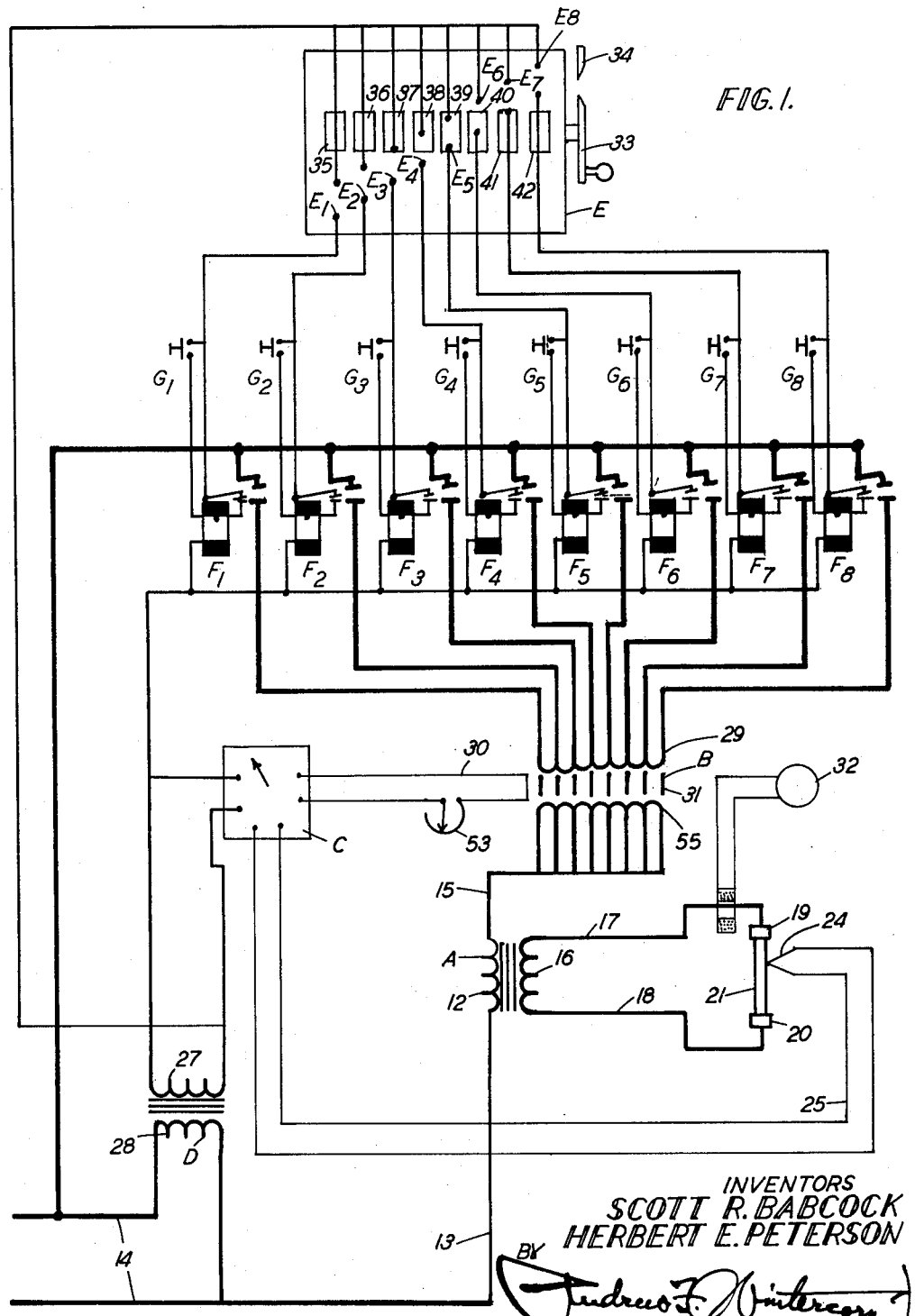
FIG. 1 is a circuit diagram of the electrical resistance heating apparatus of our invention, and illustrating one application thereof.
Figure 2:
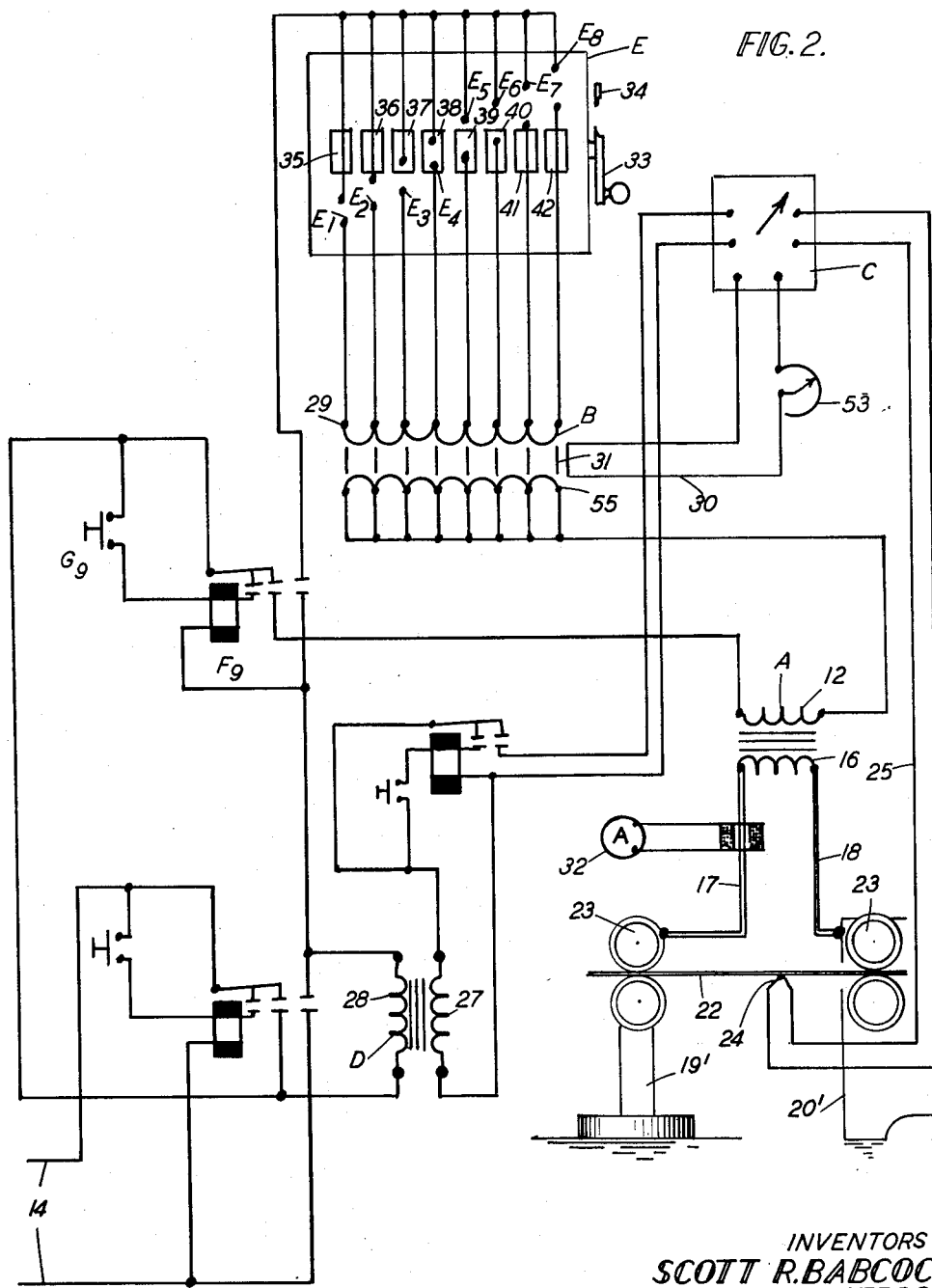
FIG. 2 is a variation of the above diagram, showing another application thereof.

Referring to FIG. 1, in which the invention has been illustrated as applied to a single-phase system, although the invention is, of course, not limited to such application but is also applicable to a three phase system, the reference letter A designates a step-down transformer, the higher voltage input winding 12 of which is connected at one end, as indicated at 13, to one side of the line conductors 14, the other end being connected, as indicated at 15, to one of the windings of the saturable core reactor B. The low voltage, high amperage output coil 16 of the transformer A has its opposite ends connected, as shown at 17 and 18, with the terminals 19 and 20 of the heater for the heating or warming of rods, bars or pipes 21, or sheet material or wire 22, as seen in FIG. 2, that may be fed continuously between rollers 23 shown in FIG. 2 as connected with terminals 19' and 20', as, for example, in any forming operation, to increase the plasticity of the metal and make the operation easier to perform and accordingly extend die life, or to heat billets or blanks, either for their full length or at one or both ends, or to heat sheets individually, where each sheet, as indicated at 22' in FIG. 8, is gripped at its opposite ends in jaws 23' for heat-treating, or stretch-forming and punch press work. The transformer A and the rest of the apparatus components (B and so forth) are all preferably housed in a sturdily built unit mounted on heavy duty casters adapted for rolling to the location where the work is to be done, and plugged into the power circuit at that point and the terminals applied to the rod, wire, bar, sheet, billet, blank or other part or piece to be heated, warmed or heat-treated, and thus heat or warm the same to a controlled temperature, either individually or while the material is fed between rollers, the heating or warming in any case being checked by a temperature sensing head 24 connected, as indicated at 25, in FIG. 1 with the temperature control instrument C that is shown diagrammatically in FIGS. 1 and 2 and in greater detail in FIG. 3. The instrument C picks up the signal transmitted from the sensing head 24 and amplifies it to the separate winding of the saturable core reactor B and accordingly controls the current output from transformer A within a range of 10% to 90% of the rated output of said transformer.

Figure 3:
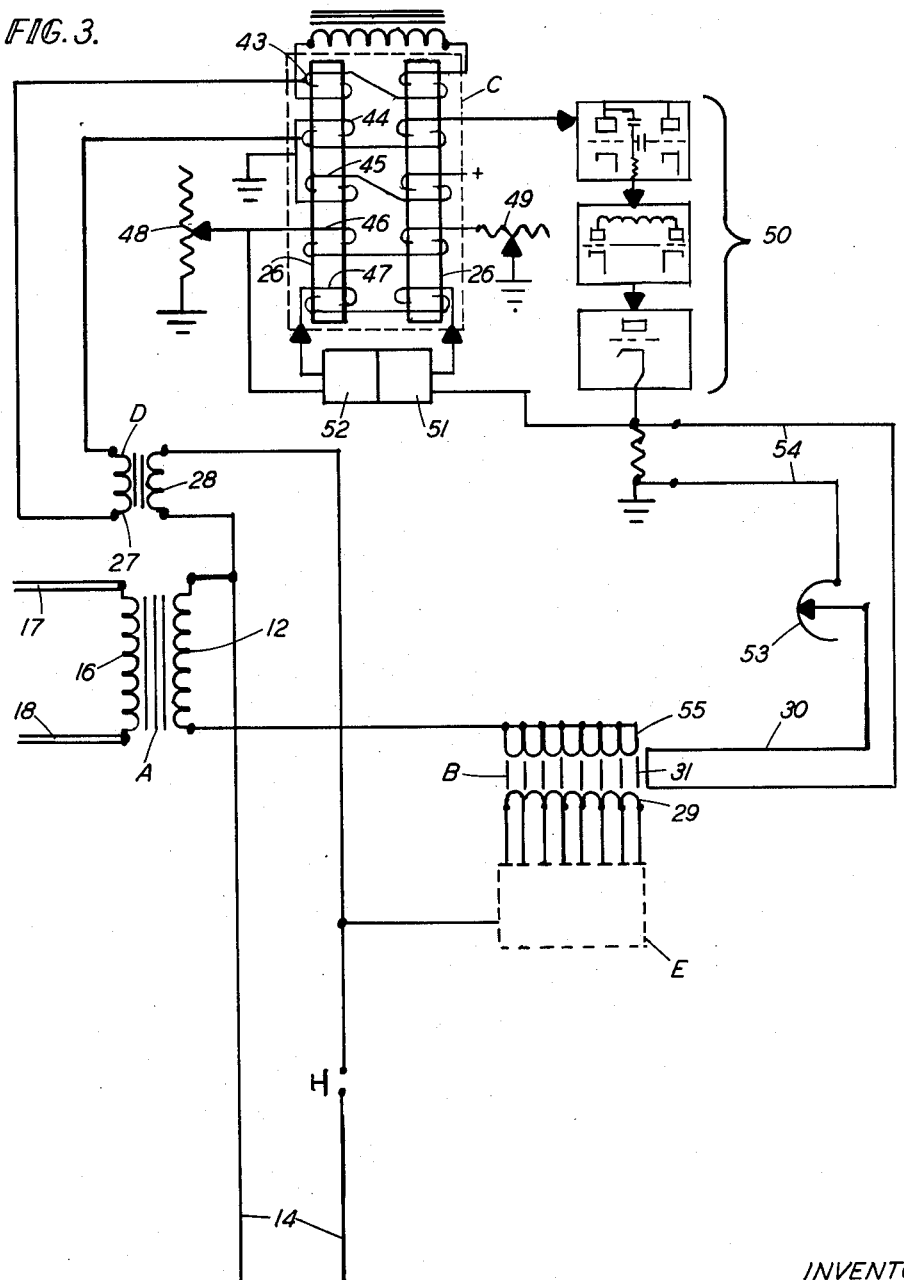
FIG. 3 is a circuit diagram related to FIGS. 1 and 2 showing the invention in greater detail as to the magnetic modulator.

The control instrument C may be any type of instrument which will control the saturating current supplied to the reactor B proportionally to the condition of the work. The instrument as shown is a magnetic modulated controller marketed by Wheelco Instruments Division of Barber Colman Company and is well adapted for use in the present circuit although other types of instruments could be used. The controller illustrated in FIGURE 3 comprises two saturable cores 26 with corresponding windings connected in series, as shown in FIG. 3, and energized by 110 volt current supplied to it from the secondary winding 27 of a small transformer D, whose primary winding 28 is connected across the line 14. The magnetic modulator C controls the saturable core reactor B in the follownig manner: A direct saturating current is fed into the control or middle winding 31 of the saturable core reactor B, as indicated at 30. How this saturating current is produced will be described later. The core material of the control winding 31 of the saturable core reactor B exhibits a nearly rectangular hysteresis loop, which means that a very high magnetic field strength is obtainable. The direct current signal in the control winding 31 changes the core's permeability and the reactance can be varied to present a variable impedance to the alternating current source of power. The saturable core reactor B is shown connected in series with the primary of transformer A which supplies the heating current to the load 21 or 22 and the direct current in the control winding 31 varies the current in the load and this current is indicated by the ammeter 32. Thus, when the control power ($I^2 R$) is low, the alternating current power delivered to the load is also low, and the converse is also true.

At E is indicated diagrammatically a selector drum switch having a crank 33 for rotation thereof relative to a suitable stationary index 34, so that any one of a series of contacts 35—42 may be selected, depending upon which set of fixed contacts $E_1$—$E_8$ is connected with their associated contacts in the drum switch. Thus, drum contact 39 is shown selected in FIG. 1 (38 in FIG. 2) and is accordingly indicated at 34 on the end of drum E adjacent crank 33. The circuit output at 19—20 (or 23—23) is determined by the contact selected, and the graduations on the end of the drum E may be marked in those terms, so that the operator is not apt to be confused. To insure that the intended contact is connected into the circuit, we provide in FIG. 1 that the operation is completed by the operator, after turning drum E to the appropriate position, by depressing the appropriate push-button of the group $G_1$—$G_8$, which are preferably labelled to correspond with the labelling on the end of drum E. The depression of the appropriate push-button energizes the related two-contact type of relay in the set $F_1$—$F_8$, so that an interlock is obtained and a selected circuit output will continue until the operator turns the drum E to some other position for a different circuit output, and, in the latter case, having selected another one of the contacts in group 35—42, the interlock referred to is disturbed, because the relay in the group $F_1$—$F_8$ is automatically opened when drum E is turned, and, to establish a new circuit for the new circuit output, the operator must depress the appropriate push-button in the group $G_1$—$G_8$ to energize the related one of the relays in the group $F_1$—$F_8$. In FIG. 1, a typical closed loop circuit is shown with drum switch E turned to select contact 39, and push-button $G_5$ is indicated as moved to the dotted line closed position to energize relay $F_5$ to its dotted line closed position to select the desired tap and consequently the desired number of effective turns in the primary winding 29 of the saturable core reactor B.

FIG. 2 is a simplification of the circuit shown in FIG. 1 wherein most of the relays in group $F_1$ to $F_8$ have been eliminated. However, the operation of the circuit is the same with the exception that separate load buttons $G_5$ are no longer necessary, a single switch $G_9$ being shown connected with a single relay $F_9$. The application shown in FIG. 2 is a conducting material 22, such as wire, bar, rod, tubing or sheet material, which is heated before going into a forming or production machine. It also shows a thermocouple 24 adjacent to and in contact with the work that is being heated. This thermocouple can have an optical or other sensing head.

FIG. 3 shows somewhat in detail a typical magnetic modulating control C in which two saturable transformers 26 are shown with corresponding windings connected in series. A current of nearly constant magnitude and phase is passed through an A.C. exciting winding 43 on each of the cores 26 by means of high resistance in the supply leads. The voltage drops across the windings are equal so long as the reluctances of the cores are equal. The magnetic modulator is used to convert an A.C. error signal to D.C., and also to add reset and other corrections to the error signal. The two cores 26 are provided with output windings 44 connected in series opposition, so that when the reluctances in the cores are equal the net output voltage is zero. Each core is provided with a bias winding 45 through which is passed a D.C. current of sufficient strength to saturate the core. The additional windings 46 and 47 are signal input coils, which are also connected in series opposition, so that the D.C. current flowing in one of the circuits adds to the reluctance of the bias winding in one core while subtracting in the other core, to increase reluctance of one core as the reluctance of the other decreases. The A.C. voltages induced in the output windings no longer cancel, and a net output voltage appears, which varies in phase and magnitude with the direction and strength of the D.C. error signal voltage. Since two signal windings are used, the algebraic sum of the signal windings reluctance determines the output phase and amplitude. Signal winding 47 is energized by the error voltage obtained from the control slide wire 48, the slider of which is operated by a temperature control instrument that is connected with the sensing head 24. The voltage across this circuit varies from +5 volts D.C. to —5 volts D.C. and is zero when the slider is in a central position, when the condition is at the desired control point. The current in this circuit is a function of the slider voltage and also the setting of the proportional band rheostat 49. The output voltage of the magnetic modulator is amplified by means of a magnetic amplifier 50 and applied to a phase detector circuit. The output of the phase detector is fed into a micro-relay. In order to obtain a current output proportional to the requirements, an additional output stage is used which incorporates a cathode follower output circuit. The micro-relay determines the charging or discharging of a capacitor-resistor network which enables the cathode power output circuit to change as required or remain constant for long periods of time.

The desired rate of heating remains constant due to the following circuit: When the control condition is constant, the control slide wire 48 is centered and no current flows in the control winding 46. The grid of the integrating circuit 51 and the grid of the differentiating circuit 52 are both at the same potential and no current flows in the control winding 47, so that the net output of the magnetic modulating control C is zero. However, if the control condition deviates from a desired value, for example, in the high direction, a current is caused to flow in control winding 46 because the slide-wire 48 moves in the negative direction. The magnitude of the current flowing depends upon the slider motion and the resistance set on the proportional band rheostat 49. The current in the control winding causes an output voltage to appear across winding 44 and the output causes the control variable to operate in a decreasing process energy output, causing the temperature or variable to decrease. As the control variable changes, the feed-back becomes more negative, and, since the time constant of the condenser in the integrating circuit 51 is long, the potential of the grid tube goes down at practically the same rate as the slider. The cathode potential also goes down at approximately the same rate. This causes a potential difference between the cathodes, which causes a current to flow in control winding 47. This current is in the proper direction to reduce the effect of the current in the control winding 46, due to the series opposition winding. The output current has changed enough to make the current in winding 47 equal to the current in winding 46, and the output of the modulator C becomes zero, and the control variable remains at the "balanced" position. The setting of the proportional band rheostat 49 determines the magnitude through which the output must change to rebalance a given setting. Thus, with 40,000 ohms in this rheostat, the effect of a complete sweep of the control slide-wire 48 would cause a power change of 4% of its range. Now, if we regard the differentiating circuit's potential as changing, it can be seen that the condenser in this circuit and the rate-time resistance network form a differentiating circuit which varies the potential of the grid by an amount and direction dependent upon the rate and direction of the change in control conditions, and this circuit acts to correct by adding to or subtracting from the position of the control slide-wire, an effect due to its velocity. When the controlled condition is changing, the output is stepped up or is retarded, depending upon the direction of change. Hence, if, for example, the condition is too high and is increasing, the output will be less than if the condition is too high but is decreasing. The rate time, which indicates the change in value position per condition change per minute, is varied by adjusting the rate time rheostat within the differentiating circuit. Thus, if a maximum rate of four minutes is desired, the condition is achieved by using a 4000 ohm rheostat.

Other types of magnetic modulating controls may be used but are not disclosed herein because they embody saturable transformers, magnetic amplifiers, and the error signal-constant output method. The magnetic modulator C is much more suitable than the chopper type circuit since it requires no regulated power supply, and should have indefinite life.

The error signal needed to maintain the desired A.C. output of the magnetic modulator C is obtained from a thermo-pile 24, although a thermo-couple, photo-electric cell, or any other temperature sensing head could be used, and applies the error signal to the two signal input coils 46 and 47. This error voltage, in effect, triggers the slide-wire 48 to move in either a negative or positive direction. The output of the magnetic modulating control C is tuned to a nicety by an additional rheostat 53 located in the output line 54 of C. This rheostat also damps rapid changes in the saturating current and adds stability to operation of the system and limits saturation of the reactor when starting up with a cold workpiece thereby limiting maximum flow of heating current. From the secondary 55 of B there is a resulting high voltage which is applied to the load through the step-down transformer A. The final output of the apparatus is a low voltage, high amperage heating current, which is monitored by an ammeter 32 connected in series with the load.

In conclusion, while we have shown the saturable core reactor B series connected, that being the preferred arrangement, it should, of course, be understood that the invention is not to be regarded as limited to that arrangement of the reactor, inasmuch as it could be parallel connected.

Figure 4:
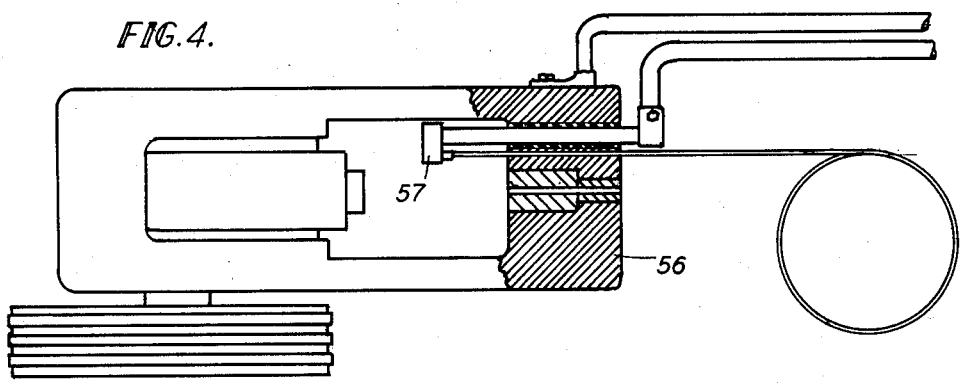

FIG. 4 is a schematic drawing of a heading machine, punch press or the like, in which the frame 56 of the machine is grounded and the stop 57 for the wire or other stock is insulated and energized with the other leg of the transformer output. When the stock comes in contact with the stop 57 and the current is applied, the stock or wire that is between the stock stop and the machine heats up to the temperature of the control instrument. It is then sheared off and transferred to the header die from the cut-off die in the usual manner.

Figure 5:
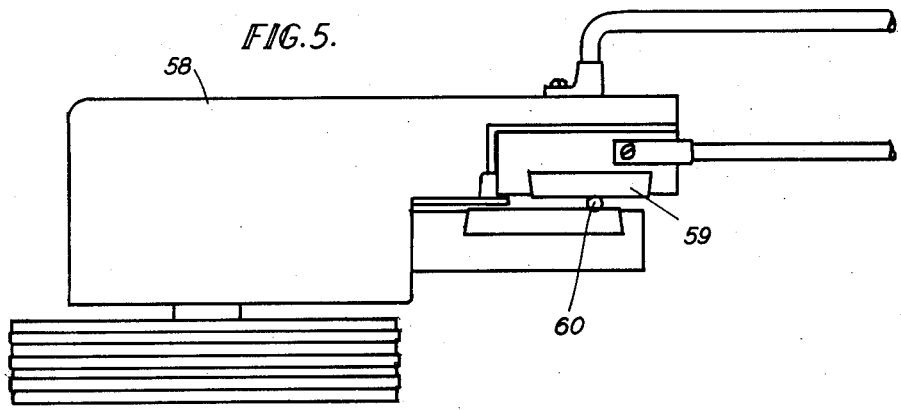

FIG. 5 is a schematic drawing of a roll-threading machine of the reciprocating type. However, this method could also apply to other types of roll-threading machines of the planetary die and roller die types. In this application, the frame 58 of the machine again is grounded with one leg of the transformer and the die or roller 59 is insulated from the machine and the other leg of the transformer output is attached to it. When a work piece 60 is inserted the circuit from the transformer is completed and the piece 60 heats up because of its resistance. Again, as with the other applications, the temperature is controlled by the method of FIGS. 1, 2, and 3.

Figure 6:
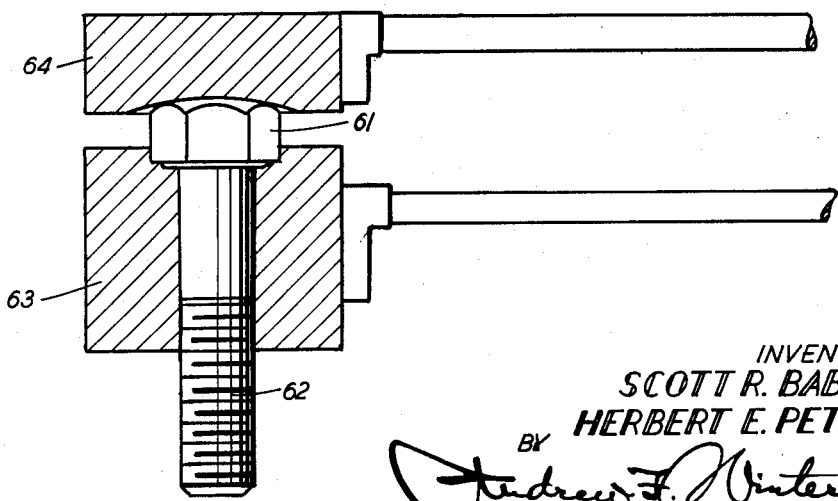

FIG. 6 shows a schematic drawing where the heating apparatus of our invention can be used for just heating the head 61 of a bolt 62, or heating any other workpiece, when this is of any advantage. The bolt 62 is clamped between jaws 63—64 and one leg of the transformer is attached to one of said jaws. The other leg of the transformer is attached to the other jaw. The current is applied and the temperature of the head 61 is controlled as mentioned above. This shows how this method of heating is adapted for localized heating and localized heat treating.

FIG. 7 shows a continuous type heat treater 65 that can be used in the annealing or heat-treating of bars, tubing, wire or sheets 66. The big advantage here is that only the work between rollers 67 requiring the heat gets heated, it is not necessary to heat the entire furnace 65. With this arrangement, the entire operation can be done in an insulated enclosure 65 and a suitable atmosphere or gas can be introduced as at 68—69 into the insulated enclosure for the heating or heat-treating process. The drawing shows where the contacts are insulated at 70 from each other and each one's heating application connection 71 to the transformer legs. In this case, as in the others, the output or temperature is controlled by the temperature controlling device and is maintained at a given value, whether the stock is standing still or is in motion.

FIG. 8 is a schematic drawing of a sheet metal heat treater 72 of a batch type where the sheet of metal 22' is clamped as at 23' in an insulated enclosure which could be water-cooled. The current is applied as in other applications by clamping on the contactors. Again, ports are shown at 73 and 74 for introducing atmosphere of a protective gas.

FIG. 9 is a schematic drawing of an extruding machine where the billet 75 is heated in the machine instead of being placed in a heating furnace or a coil. The extruding die 76 and the ram 77 are insulated from the frame 78 of the machine, and the extruding die and the ram are both connected to separate legs of the transformer and enough hydraulic pressure is applied for a good electrical connection before the heating current is applied. Again, the temperature control mentioned in the foregoing applications applies here.

FIG. 10 is a schematic drawing of a furnace muffle 79. Instead of having a heating element surrounding a muffle, the muffle itself is used as a heat source. This can be applied to a vacuum furnace, box furnace, retort furnace, tube furnace or salt pot furnace, for heat-treating and other similar operations. The advantage here is obvious in that there is less loss of heat and efficiency because the heating element no longer has to heat the muffle first. The resistance in the muffle material when the current is applied as at 80 produces the heat directly adjacent the work to be heat-treated.

FIG. 11 is a schematic drawing showing resistance heat being used in wire drawing. This application is different from some which have been tried in that the temperature is controlled and anticipated in this process. The two connecting points from the transformer are the rollers 81 or the contactor stand therefor, and the extruding die 82, as indicated at 83.

It is believed the foregoing description conveys a good understanding of the objects and advantages of our invention. The appended claims have been drawn to cover all legitimate modifications and adaptations.

We claim:

1. In an electrical heating apparatus, the combination of a step-down transformer, the output winding of which is adapted to be connected across the material or part to be heated or warmed with low voltage, high amperage heating current, the input winding of said transformer having one end adapted to be connected with an alternating current power source, a saturable core reactor comprising core material, a saturating winding and a pair of load windings one of which has a plurality of taps and which are connected respectively to the power source and the other end of the first named input winding, switch means connected with said taps for selectively connecting in the circuit one or more or all of the sections of the tapped winding according to the rate of heating desired, a sensing head subject to the heating temperature, and means connected with the sensing head on the one hand and with the power source on another hand and with the control winding on another hand for feeding amplified direct current into said saturaing winding to cause the current to said first named input winding to vary as necessary for the maintenance of a substantially uniform heating temperature at the sensing head.

2. An electrical heating apparatus as set forth in claim 1 wherein the means for selectively energizing one or more or all of the sections of the last named input winding comprises a manually operable selector switch, a relay for maintaining a selected circuit through said tapped winding, and a manually operable switch for closing said relay after the selector switch has been moved to a selected position.

3. An electrical heating apparatus as set forth in claim 1 wherein the means for selectively energizing one or more or all of the sections of the last named input winding comprises a manually operable selector switch having a plurality of contactors thereon, separate relays connected with the contactors and with the taps of the tapped winding to maintain a selected circuit through said tapped winding, and separate manually operable switches for closing said relays after the selector switch has been moved to a selected position.

4. In combination, a step-down transformer having primary and secondary windings whereby a low voltage, high amperage current may flow in the secondary winding when the primary winding is energized, a multiple tap saturable core reactor having a D.C. control winding and core and opposed A.C. windings, one of the latter being connected with the primary winding of said transformer, said reactor having manually operable means connected with the other A.C. winding so that any tap may be selected in the energization of the primary winding of said transformer, a sensing means subject to the current flowing in said secondary winding, and a control unit connected with said sensing means and with said control winding to feed variable direct current proportional to the value sensed by the sensing means into the D.C. control winding of the reactor to maintain a selected current flow in the secondary.

5. The combination as set forth in claim 4 including a manually adjustable rheostat in the circuit of said D.C. control winding for close adjustment of the control current.

References Cited in the file of this patent
UNITED STATES PATENTS

| | | |
|---|---|---|
| 1,955,319 | Whittaker | Apr. 17, 1934 |
| 2,223,796 | Sparrow | Dec. 3, 1940 |
| 2,297,836 | Levy | Oct. 6, 1942 |
| 2,651,018 | LaMarche | Sept. 1, 1953 |
| 2,694,176 | Lang | Nov. 9, 1954 |
| 2,828,405 | Morrison | Mar. 25, 1958 |
| 2,885,628 | Pell et al. | May 5, 1959 |
| 2,910,626 | Koros | Oct. 27, 1959 |